United States Patent
Sihm et al.

(10) Patent No.: US 6,753,716 B2
(45) Date of Patent: Jun. 22, 2004

(54) BALANCED LOAD SWITCH

(75) Inventors: Henrik Sihm, Malmö (SE); Jesper Riishöj, Snekkersten (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/200,199

(22) Filed: Jul. 23, 2002

(65) Prior Publication Data

US 2004/0017244 A1 Jan. 29, 2004

(51) Int. Cl.$^7$ ............................................. H03H 11/26
(52) U.S. Cl. ........................ 327/290; 327/110; 326/30
(58) Field of Search ............................... 327/382, 108, 327/334, 538, 110, 290, 307, 519; 328/30, 82; 330/302, 292; 455/250.1, 248.1, 320, 330; 333/124, 125, 126, 131

(56) References Cited

U.S. PATENT DOCUMENTS

| | | | | |
|---|---|---|---|---|
| 3,849,677 A | * | 11/1974 | Stacy et al. ................... 333/17 |
| 4,701,732 A | * | 10/1987 | Nestlerode .................... 334/56 |
| 5,146,192 A | * | 9/1992 | Kondo et al. ................ 333/164 |
| 5,457,427 A | * | 10/1995 | Wong et al. ................. 330/302 |
| 5,737,033 A | * | 4/1998 | Masuda ....................... 348/678 |

* cited by examiner

Primary Examiner—My-Trang Nu Ton
Assistant Examiner—Hep Nguyen
(74) Attorney, Agent, or Firm—Antonelli, Terry, Stout & Kraus, LLP

(57) ABSTRACT

The present invention relates to a circuitry for impedance matching. The invention utilizes circuitry for impedance matching, which circuitry for example is connected to a differential or balanced power amplifier or some other device in need of output impedance tuning. The circuitry includes at least one inductance connected to at least one device which conducts when being forward biased, and a direct current (DC) source controlling the conduction of the device. The circuitry eliminates the DC component of a signal passing through it. By controlling the device that is conducting when it is forward biased, it is possible to turn the circuitry on and off, thus altering the impedance at the output of the amplifier. Hence, a load switch has been created at the output of the amplifier.

2 Claims, 5 Drawing Sheets

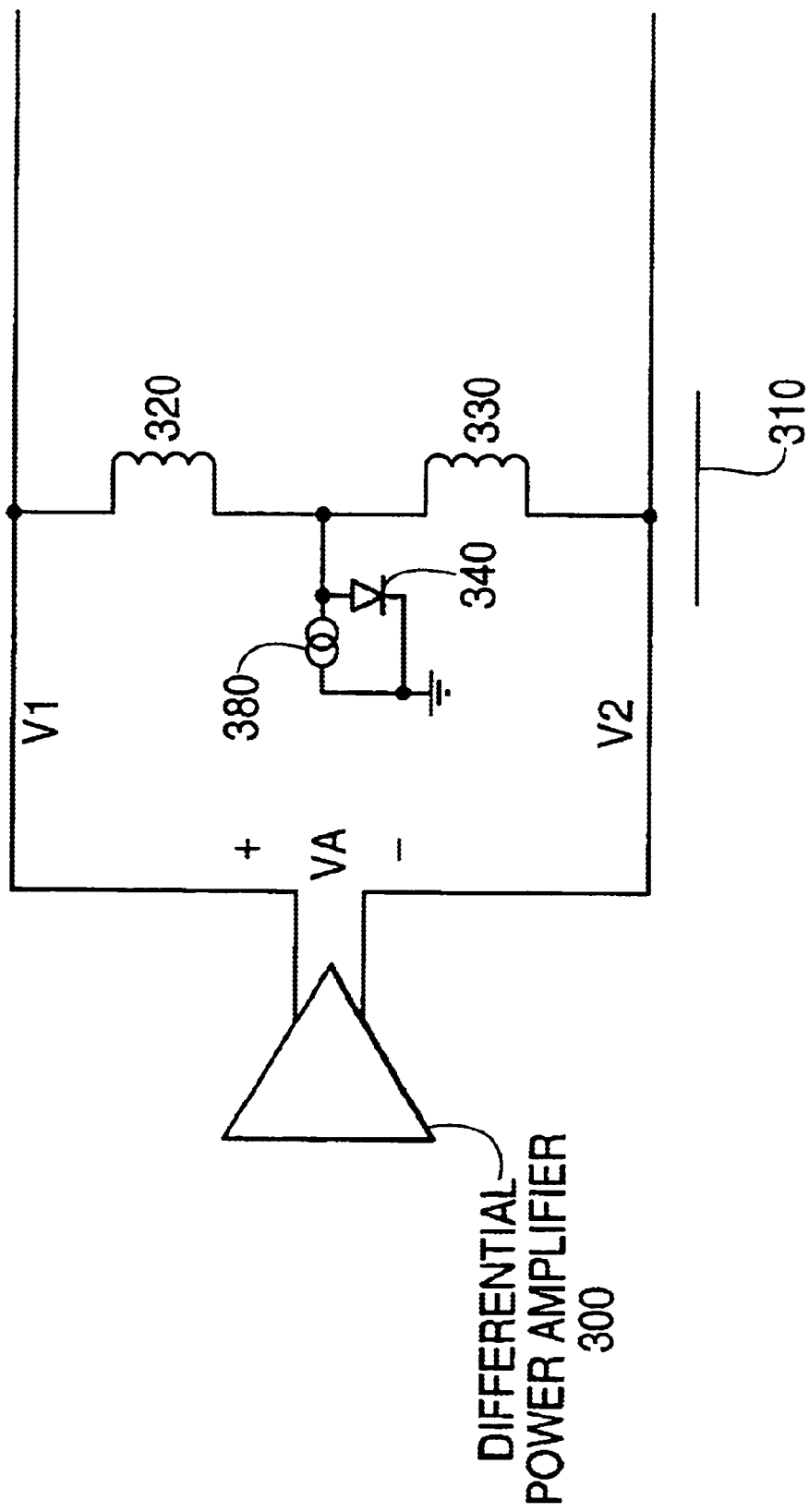

BALANCED LOAD SWITCH

TECHNICAL FIELD OF THE INVENTION

The present invention relates to a circuitry for impedance matching.

BACKGROUND ART

When connecting high frequency electronic circuitry to each other, it is often necessary to match the output impedance of one circuitry to the input impedance of the other. For example, when connecting a power amplifier (PA) to an antenna load, it is necessary to match the PA output impedance to the antenna load input impedance. The typical impedance value is 50 Ohms for the antenna. In case of mismatch, the energy sent from the PA will be reflected at the antenna input and sent back to the amplifier. This could damage the power amplifier. Even if the reflection does not damage the amplifier, impedance matching is necessary seen from a power efficiency perspective. If the output impedance of the PA matches the input impedance of the antenna perfectly, all the power leaving the output of the amplifier will be absorbed by the antenna.

In mobile telephony applications, the output terminal of a power amplifier is typically at 2 Ohms and needs to be matched to the typical value of 50 Ohms for an antenna. This is normally done with an output matching scheme such as two pi matching, which implies that two low pass filters are connected in series between the amplifier and the antenna.

The matching is usually designed to meet requirements regarding PA output power and power efficiency. The object of the design is to provide maximum efficiency at high output power of the amplifier, i.e. the PA should deliver the required amount of power in an efficient manner. The power dissipated in the amplifier due to low efficiency of course raises the temperature of the transistors in the amplifier, and if the temperature becomes too high, the transistors will be damaged or destroyed. Other aspects of good efficiency is the life of batteries in battery-powered devices. An RF power amplifier is often used in Mobile Communications Equipment (MCE), and the matching is optimized for a high efficiency at a high power level. As the MCE is moving away from this optimized working point it has been tuned to, to a lower output power, the efficiency will decrease. A load switch can be utilized to tune the efficiency to a maximum at this lower power level by introducing a new load that can be switched on and off.

A problem with load switches in the prior art is that they are space-demanding and expensive to produce.

SUMMARY OF THE INVENTION

The present invention is a load switch for a differential or balanced power amplifier that is simple in design, yet highly effective, inexpensive and small.

The present invention utilizes circuitry for impedance matching, which circuitry for example is connected to a differential or balanced power amplifier or some other device requiring output impedance tuning. The circuitry includes at least one inductance connected to at least one device which conducts when being forward biased, and a direct current (DC) source controlling the conduction of the device. The circuitry eliminates the DC component of a signal passing through it. By controlling the device that is conducting when it is forward biased, it is possible to turn the circuitry on and off, thus altering the impedance at the output of the amplifier. Hence, a load switch has been created at the output of the PA.

According to an embodiment of the invention, the device which conducts when being forward biased consists of a PIN diode. PIN diodes are often used for switching radio frequency (RF) signals. The diode consists of heavily doped p and n regions separated by an undoped region referred to as "intrinsic" (hence the name "PIN"). When applying a forward DC bias to the diode, it starts to conduct. When removing the DC bias, the conduction of current stops. Consequently, while the diode is conducting forward bias current, the diode conducts a high-frequency signal superimposed on the bias current. At high frequencies, when being forward biased, the diode acts as resistor whose resistance increases as the bias current decreases, i.e. acting as a low ohmic short when a sufficient bias current is applied. The DC component in the signal passing through the load switch is removed to prevent the DC component from controlling the conduction of the PIN diode. By using PIN diodes, controlling the switching of the load switch is easy. All that has to be done is to control the DC bias to the diode.

According to another embodiment of the invention, a first electrode of a first inductance is connected to a first output of the power amplifier and a second electrode of the first inductance is connected to a first electrode of the PIN diode. The direct current source is connected to the first electrode of the diode and a first electrode of a second inductance. The second electrode of the diode is connected to ground and a second electrode of said second inductance is connected to a second output of said power source.

This embodiment is advantageous by eliminating the need for space-demanding, expensive capacitors used in prior art load switches and utilizes a minimum of PIN diodes, making the load switch small and inexpensive to produce.

Further features and advantages of the present invention are apparent from studying the following description.

BRIEF DESCRIPTION OF THE DRAWINGS

The present invention will be described in greater detail with reference to the following drawings, wherein:

FIG. 5 shows a circuit diagram of a load switch according to the invention.

DESCRIPTION OF PREFERRED EMBODIMENTS OF THE INVENTION

Figure 1:
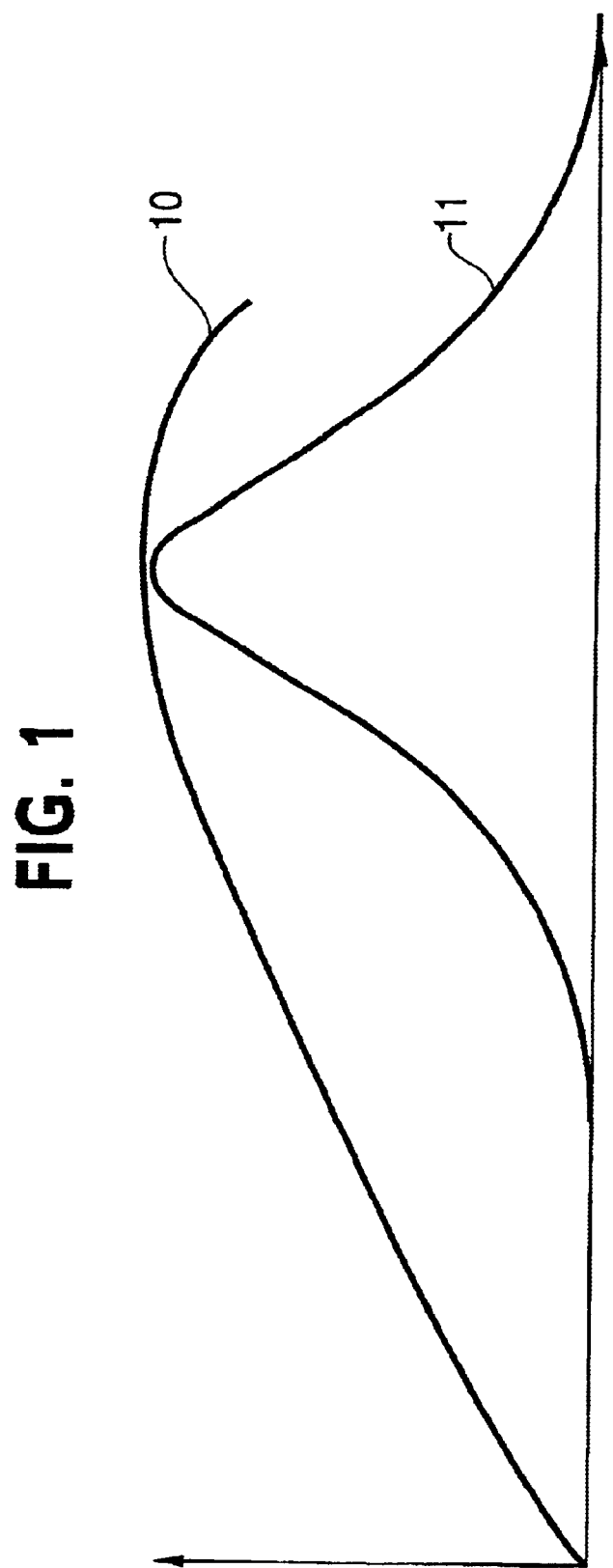
FIG. 1 shows a typical graph of the output power of a power amplifier and the efficiency curve of the power amplifier when the efficiency has been optimized at maximum output power.

A typical graph of the output power curve 10 of a power amplifier and the efficiency curve 11 of the power amplifier versus power control of the power amplifier when the efficiency has been optimized at maximum output power is shown in FIG. 1. The efficiency is optimized by tuning the output impedance of the amplifier to match the input impedance of the load to which the amplifier is connected. When the output power is decreased, the efficiency decreases as well.

Figure 2:
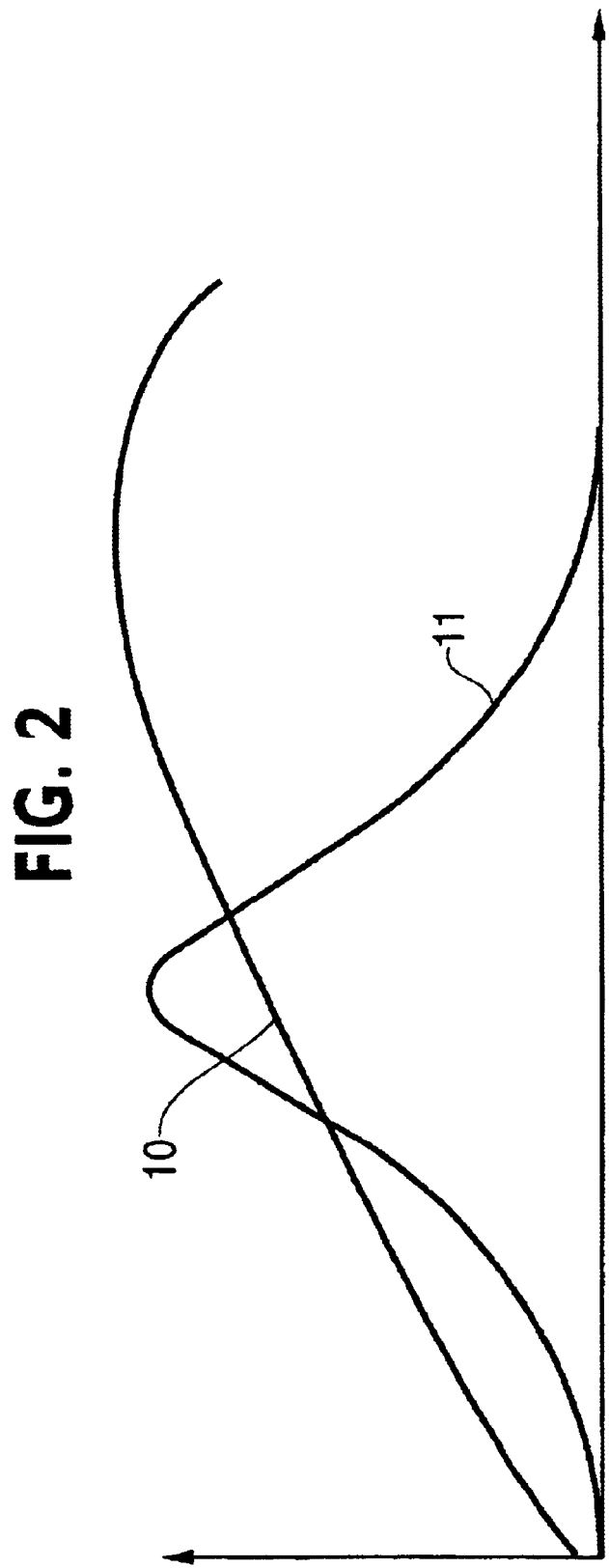
FIG. 2 shows another typical graph of the output power of a power amplifier and the efficiency curve of the power amplifier when the efficiency has not been optimized at maximum output power.

It is therefore desirable to be able to move the efficiency curve 11 along the output power curve 10 as the output power changes. This is shown in FIG. 2, and the movement of the efficiency curve 11 is enabled by changing the output impedance of the power amplifier. Thus, a load switch is necessary to preserve the efficiency of the amplifier. This is of particular importance in battery-powered MCEs.

Figure 3:
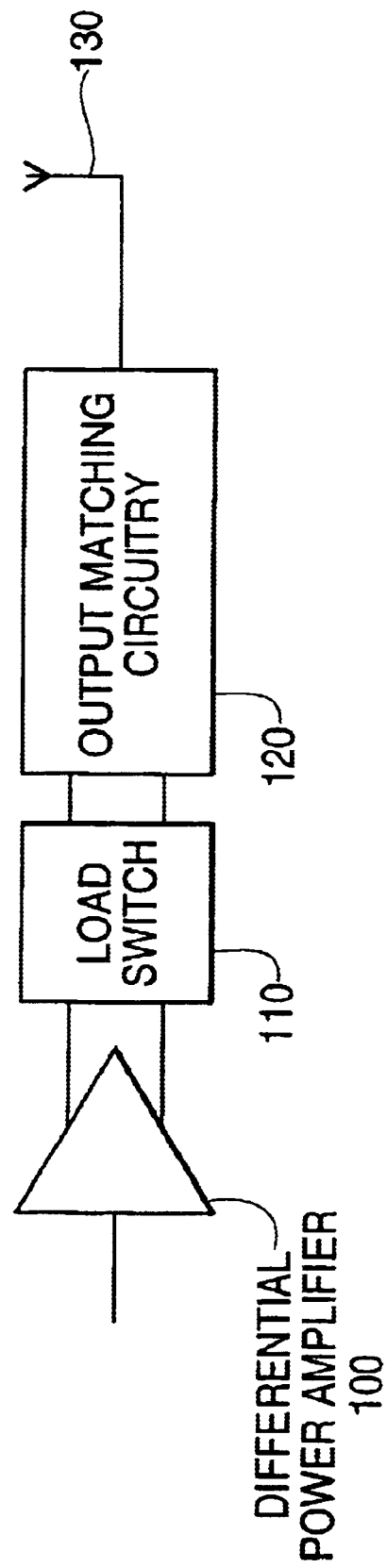
FIG. 3 shows a block scheme of an impedance matching network connected between a power amplifier and an antenna.

A block scheme of an impedance matching network in the form of a load switch 110 and an output matching circuitry 120 connected between a power amplifier 100 and an antenna 130 is shown in FIG. 3. The load switch 110 is preferably inserted at the power amplifier output, where the signal voltages still are relatively low. The signal voltage at the input of the antenna is typically 20V, whereas the PIN diodes of the load switch 110 typically can withstand about 5V.

Figure 4:
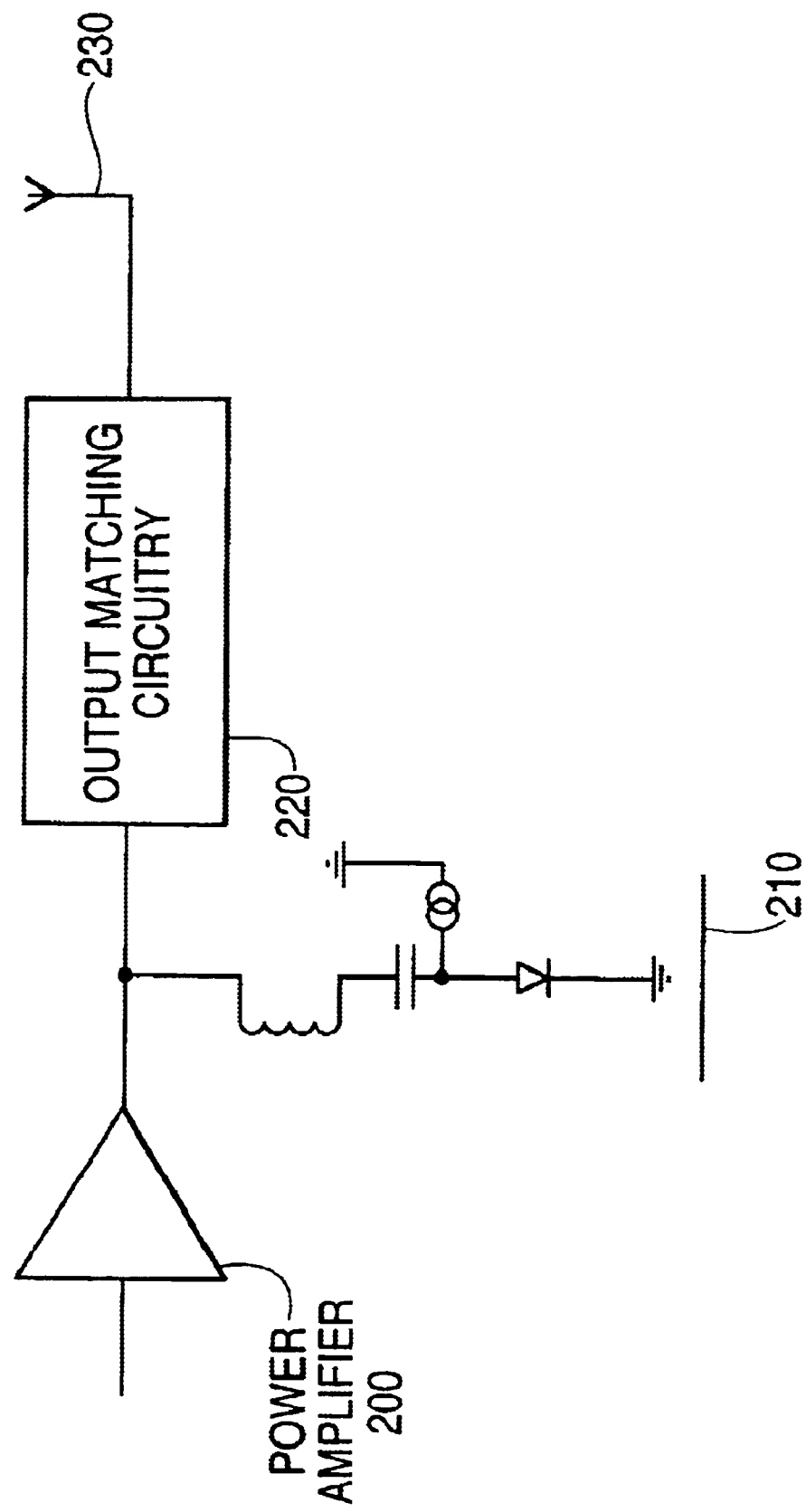
FIG. 4 shows a circuit diagram of a prior art load switch.

A prior art load switch is shown in FIG. 4, where the load switch 210 is connected between a power amplifier 200 and an output matching circuitry 220. As in FIG. 3, an antenna 230 terminates the output matching scheme. A problem with this type of prior art switch is that it utilizes a capacitor to remove any DC components in the signal at the power amplifier output, and capacitors are space-demanding and expensive.

A circuit diagram of a load switch 310 according to the invention is shown in FIG. 5. In this embodiment, the load switch 310 is connected to the two outputs of a differential power amplifier 300. As can be seen, the load switch 310 comprises a first inductance 320, a second inductance 330, a PIN diode 340 and a DC source 360. A first electrode of the first inductance 320 is connected to the first output of the power source, i.e. the power amplifier 300, and a second electrode of the first inductance 320 is connected to a first electrode of the PIN diode 340. The DC source 360 is connected to the first electrode of the PIN diode 340 and a second electrode of the PIN diode 340 is connected to ground, wherein the diode 340 is conducting when being forward biased. The first electrode of the PIN diode 340 is connected to a first electrode of the second inductance 330 and a second electrode of the second inductance 330 is connected to the second output of the power amplifier 300.

This creates a simple, effective and inexpensive load switch. The voltage difference between the outputs of the power amplifier 300 can be calculated as:

$$VA-V1-V2=0 \Rightarrow VA=V1-V2=V1_{AC}+V1_{DC}-(V2_{AC}+V2_{DC})$$

$$V1_{DC}=V2_{DC} \Rightarrow VA=V1_{AC}-V2_{AC}$$

The inductors 320 and 330 are the tuning elements of the load switch 310 and are typically in the order of 1 nH. The load switch according to the invention is cheap to produce as it does not contain any capacitors. Consequently, it also becomes smaller than prior art load switches.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

What is claimed is:

1. A circuit for impedance matching comprising:

first and second inductances each having first and second electrodes with the second electrodes being connected to each other;

at least one device which conducts when forward biased and having first and second electrodes, each second electrode of the at least one device being connected to the second electrodes of the first and second inductances and the first electrode of the at least one device being connected to a reference potential;

a direct current power source having a first electrode and a second electrode, the second electrode of the direct current power source being connected to the second electrodes of the first and second inductances and each second electrode of the at least one device and the first electrode of the direct current power source being connected to the reference potential; and a differential power amplifier having outputs respectively coupled to the first electrodes of the first and second inductances; and wherein a DC component from the differential power amplifier is eliminated from passing through the first and second inductances.

2. The circuitry according to claim 1 wherein:

the at least one device which conducts when forward biased is a PIN diode.

* * * * *